United States Patent
Schmid et al.

(10) Patent No.: US 11,901,852 B2
(45) Date of Patent: Feb. 13, 2024

(54) PROCEDURE FOR DETECTING A TRANSMISSION BACKLASH IN A POWER TOOL, IN PARTICULAR A HAND-HELD POWER TOOL, AND POWER TOOL

(71) Applicant: Robert Bosch GmbH, Stuttgart (DE)

(72) Inventors: Hardy Schmid, Stuttgart (DE); Axel Kuhnle, Freiberg (DE); Hagen Philipp Keinath, Stuttgart (DE); Matthias Tauber, Duernau (DE); Sebastian Maier, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 17/488,615

(22) Filed: Sep. 29, 2021

(65) Prior Publication Data

US 2022/0105617 A1 Apr. 7, 2022

(30) Foreign Application Priority Data

Oct. 1, 2020 (DE) ...................... 10 2020 212 427.2

(51) Int. Cl.
*B25D 16/00* (2006.01)
*H02P 6/16* (2016.01)

(52) U.S. Cl.
CPC .......... *H02P 6/16* (2013.01); *B25D 2211/068* (2013.01); *B25D 2216/0084* (2013.01); *B25D 2250/095* (2013.01); *B25D 2250/221* (2013.01)

(58) Field of Classification Search
CPC ................ H02P 6/16; B25D 2211/068; B25D 2216/0084; B25D 2250/095; B25D 2250/221
See application file for complete search history.

(56) References Cited

U.S. PATENT DOCUMENTS

| 11,278,297 | B2 * | 3/2022 | Hines | A61B 90/06 |
| 2009/0208819 | A1 * | 8/2009 | Cruise | H01M 50/296 |
| | | | | 429/61 |
| 2014/0028449 | A1 * | 1/2014 | Sigal | G08C 17/02 |
| | | | | 340/12.5 |
| 2018/0175699 | A1 | 6/2018 | Henderson et al. | |
| 2020/0133227 | A1 | 4/2020 | Mikado | |

FOREIGN PATENT DOCUMENTS

| DE | 10 2005 029 791 A1 | 1/2007 | |
| DE | 102005029791 A1 * | 1/2007 | .......... G01M 13/021 |
| DE | 102007030800 A1 * | 1/2009 | ............ F16H 59/16 |
| EP | 1 307 313 B1 | 8/2007 | |

* cited by examiner

*Primary Examiner* — Thomas M Wittenschlaeger
*Assistant Examiner* — David G Shutty
(74) *Attorney, Agent, or Firm* — Maginot, Moore & Beck LLP

(57) ABSTRACT

A method for detecting a transmission backlash in a hand-held power tool, the hand-held power tool comprising a drive motor that has a drive shaft, a tool spindle, and a transmission that, in respect of drive, connects the drive shaft to the tool spindle, includes actuating, in a first actuation, the drive motor at least until the value of a first variable, representing a drag torque, is at least approximately constant. The method includes, during the first actuation, determining a value of a second variable which is associated with the rotation of the drive shaft of the drive motor during the first actuation, and determining a value of a third variable, representing a transmission backlash, based upon a change in the second variable during the first actuation.

16 Claims, 5 Drawing Sheets

PROCEDURE FOR DETECTING A TRANSMISSION BACKLASH IN A POWER TOOL, IN PARTICULAR A HAND-HELD POWER TOOL, AND POWER TOOL

This application claims priority under 35 U.S.C. § 119 to application no. DE 10 2020 212 427.2, filed on Oct. 1, 2020 in Germany, the disclosure of which is incorporated herein by reference in its entirety.

BACKGROUND

The disclosure relates to a procedure for detecting a transmission backlash in a power tool, in particular a hand-held power tool, and to a power tool, in particular a hand-held power tool, according to the disclosure.

There is already known from EP 1 307 313 B1 a hand-held power tool comprising a tool spindle and an electric drive motor that has a drive shaft which, in respect of drive, is connected to the tool spindle via a transmission.

SUMMARY

The problem on which the disclosure is based is solved by a procedure and a device having the features of the disclosure. Advantageous developments are specified in the disclosure.

The present disclosure makes it possible to determine in a very simple manner a value of a variable of a power tool, in particular a hand-held power tool, that represents a transmission backlash, and thus to obtain knowledge of a current condition of the power tool. Thus, maintenance measures can be planned and unexpected failures of the power tool can be avoided. This is made possible without the necessity of providing complex additional sensors or performing complex inspection measures. Even in the case existing power tools, the procedure according to the disclosure could be retrofitted, for example as part of a software update. Also, the acquisition of the variable representing the transmission backlash is also possible in the case of such power tools that are intended for variable operating conditions and different fields of application, that are used with different insert tools and/or that are handled by different persons.

Specifically, a procedure is proposed for detecting a transmission backlash in such a power tool that has a drive motor and a drive shaft, as well as a tool spindle having a transmission. The transmission connects the tool spindle to the drive shaft in respect of drive. According to the disclosure, in a step a the drive motor is actuated until the value of a first variable, representing a drag torque, is at least approximately constant. This may be detected, for example, by the fact of the slope of the said value being at least approximately equal to zero over a certain and predetermined period of time.

While the drive motor is being actuated, in a step b a value of a second variable, which is associated with the rotation of the drive shaft of the drive motor, is determined. This second variable may be, for example, an angle of rotation of the drive shaft or a number of revolutions of the drive shaft. What is of interest in this case, in particular, is the change in the value of the second variable up to the point in time at which the value of the first variable is at least approximately constant. In a step c, a transmission backlash, or a third variable representing it, is then determined on the basis of the change in the second variable, determined in step b, up to the point in time at which the first variable is constant.

Basically, the procedure according to the disclosure is based on the consideration that, at the beginning of the actuation of the drive motor, the tooth flanks of mutually cooperating gearwheels do not necessarily bear against each other. As the drive motor is starting up, the air between the tooth flanks of cooperating gearwheels must therefore first be, as it were, displaced. During this process of displacing the air, the torque of the drive motor is comparatively low, or increasing. Only when all tooth flanks of cooperating gearwheels bear against each other will the drive torque be substantially constant. A prerequisite, however, is that the power tool is not operated under load as the procedure is being performed, i.e. the drive motor is operated at no load. In this case, the drive torque is also referred to as the drag torque, since it only has to be high enough for all moving parts to be dragged along, i.e. for the bearing friction and the transmission friction to be only just compensated. The change in the second variable associated with the rotation during the starting-up of the drive motor is thus a measure of the transmission backlash currently present.

The procedure according to the disclosure is particularly advantageous in the case of power tools which that be operated in different operating modes or that have a transmission with different gear stages. In the case of a power drill or a rotary hammer, different operating modes may be, for example, the "drilling" operating mode, the "hammer drilling" operating mode and the "chiseling" operating mode. Other operating modes are, for example, the "screwing" operating mode and the "stirring" operating mode. It is understood that, in the case of such power tools, the procedure according to the disclosure is always performed in the same gear stage and in the same operating mode.

It is proposed in a development that, prior to step a, the drive motor be actuated in a first direction until the value of the first variable, representing the drag torque, is at least approximately constant; and that in step a the drive motor be actuated in a second direction that is opposite to the first direction. In this way, the tooth flanks on a first side of the mutually cooperating gearwheels are first brought into bearing contact, and then brought into bearing contact on a second side when the drive motor is moved from this position in the second direction. This procedure variant thus first provides a defined starting position from which the entire transmission backlash on both sides of a tooth of a gearwheel can be determined. This development thus ensures a particularly meaningful result.

It is proposed in a development that the value of the third variable determined in step c be compared with a value determined at an earlier condition point of the power tool, and a current state of wear be determined therefrom. A change in the transmission backlash is thus determined, which is a measure of wear occurring during operation of the power tool. This allows even better planning of maintenance measures (keyword "predictive maintenance").

It is proposed in a development in this regard that the earlier condition point be a factory condition. In this way, variations in transmission backlash resulting from manufacturing tolerances can be taken into account in the new state.

It is proposed in a development that the value of the third variable determined in step c be stored. The value representing the transmission backlash is thus available for subsequent evaluations.

It is proposed in a development that, in the case of a power tool having a reduction gear comprising a pinion and a gearwheel, it be performed multiple times in succession and in each case for a circumferential portion of the gearwheel. This takes into account the fact that the wear may possibly differ over the circumference of a gearwheel. This applies in particular when gearwheels that have significantly different diameters cooperate with each other, as may be the case, for example, with eccentric gearwheels of percussion drives. This development thus even allows the transmission backlash to be detected in dependence on the position of the teeth on the circumference of the gearwheel.

It is proposed in a development that the third variable, representing the transmission backlash, be an angle of rotation of the drive shaft of the drive motor. This variable can be acquired very easily.

It is proposed in a development that the first variable, representing the drag torque, be an armature current of the drive motor. Also this variable can be acquired very easily.

It is proposed in a development that the drive motor be a brushless electric motor and that the angle of rotation be sensed by at least one Hall sensor. Such a sensor is almost always fitted in such motors in any case, such that no additional costs arise.

It is proposed in a development that it be performed automatically upon the hand-held power tool being switched on and/or following changing of a battery pack. The user thus does not have to remember to perform the procedure, and the procedure is performed sufficiently frequently to enable a possibly critical condition to be identified in good time.

It is proposed in a development that it be triggered manually by a user, in particular by means of an app on a mobile operating device. This allows a user to react to a problem possibly detected during operation of the power tool.

It is proposed in a development that a message to a user be generated in dependence on an absolute value and/or a characteristic of the value of the third variable. This further increases convenience in use of the power tool.

BRIEF DESCRIPTION OF THE DRAWINGS

Further features, application possibilities and advantage of the disclosure are given by the following description of exemplary embodiments of the disclosure, which are explained on the basis of the drawing. In the following figures, elements and regions that are functionally equivalent are denoted by the same references and are not explained again in detail.

In the drawing.

DETAILED DESCRIPTION

Figure 1:
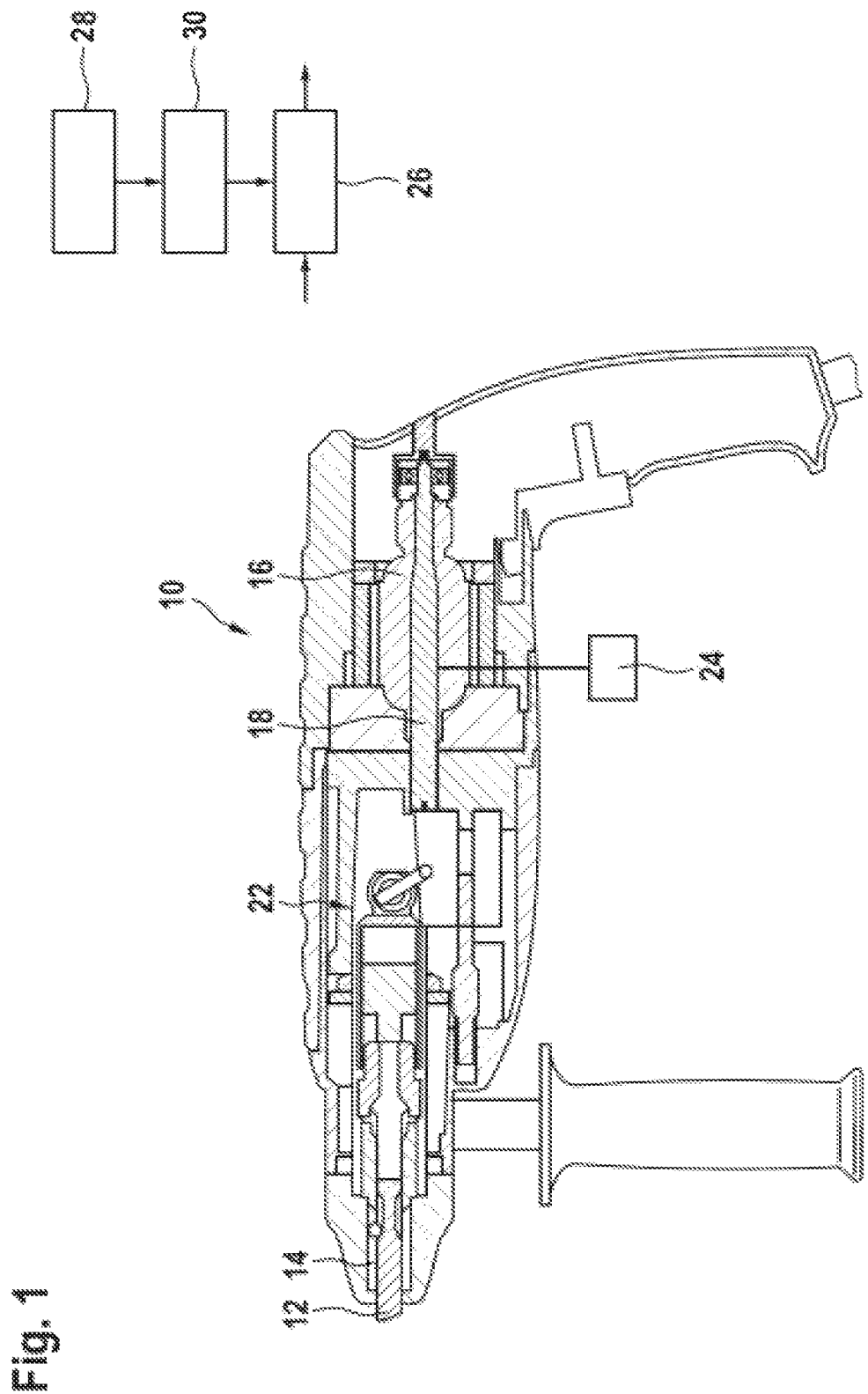
FIG. 1 shows a longitudinal section through a first embodiment of a hand-held power tool, in the form of a power impact drill, comprising a drive motor having a drive shaft, and comprising a tool spindle and a transmission that, in respect of drive, connects the drive shaft to the tool spindle.

FIG. 1 exemplarily shows a power tool in the form of a hand-held power tool 10, which is realized as a power drill having a rotary drive and a small rotary hammer. The hand-held power tool 10 can therefore drill, hammer-drill and chisel. During chiseling, a tool 12 is driven in a pulse-like translatory manner. The tool may be, for example, a chisel or a drill bit. For all of these operating modes, the tool 12 can be received in rotationally fixed manner in a rotatable tool spindle 14, in the form of a chuck, which allows the tool to be changed.

The hand-held power tool 10 further includes a drive motor 16 that has a drive shaft 18. In respect of drive, the drive shaft 18 is connected to the tool spindle 14 via a transmission 20. The transmission 20 includes a plurality of shafts and mutually cooperating gearwheels, which will not be discussed in detail here. As an example in this case, the transmission 20 has two gear stages that have different reduction ratios. A typical reduction ratio includes 25 revolutions of the drive shaft 18 resulting in one revolution of the tool spindle 14. The hand-held power tool 10 further comprises an impact drive 22, by means of which the tool spindle 14 can be acted upon in a pulsed and translatory manner.

The drive motor 16 is a brushless electric motor equipped with a Hall sensor 24. Furthermore, the hand-held power tool 10 includes an open-loop and closed-loop control means 26 having an HMI 28 ("human-machine interface"), which may be, for example, a screen that has control buttons. Furthermore, the open-loop and closed-loop control means 26 is also connected to a wireless interface 30, which allows data to be exchanged with a mobile device, for example a mobile phone or a tablet PC, for example by means of Bluetooth or WLAN.

The open-loop and closed-loop control means 26 can determine the angle of rotation α of the drive shaft 18 from the signal of the Hall sensor 24. For the underlying logic, a memory for a source code, which is not represented in more detail, and a microprocessor are provided in the open-loop and closed-loop control means 26. During operation, the electric drive motor 16 takes up a current ("armature current") having a current intensity I, from which a torque M delivered by the drive motor 16 can be derived. Without a load on the tool 12, this torque M may be referred to as the "drag torque". The current intensity I thus represents this drag torque M.

Figure 2:
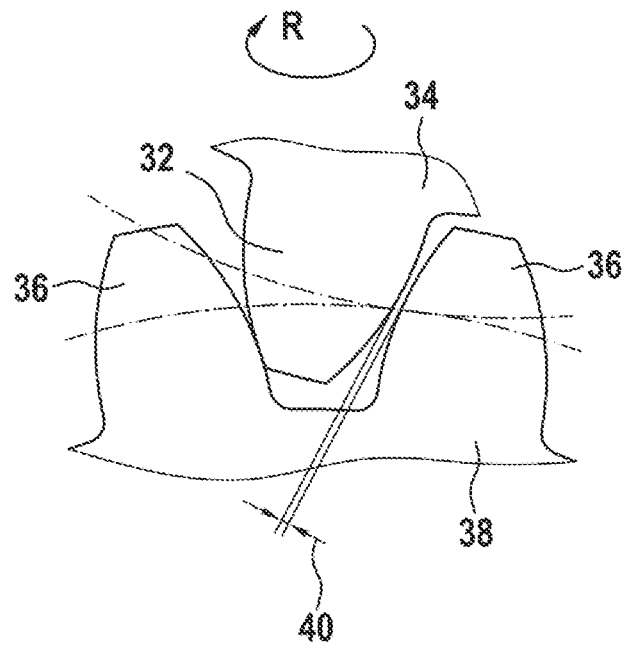
FIG. 2 shows a detail of the transmission from FIG. 1 to illustrate a transmission backlash between two cooperating gearwheels.
Figure 3:
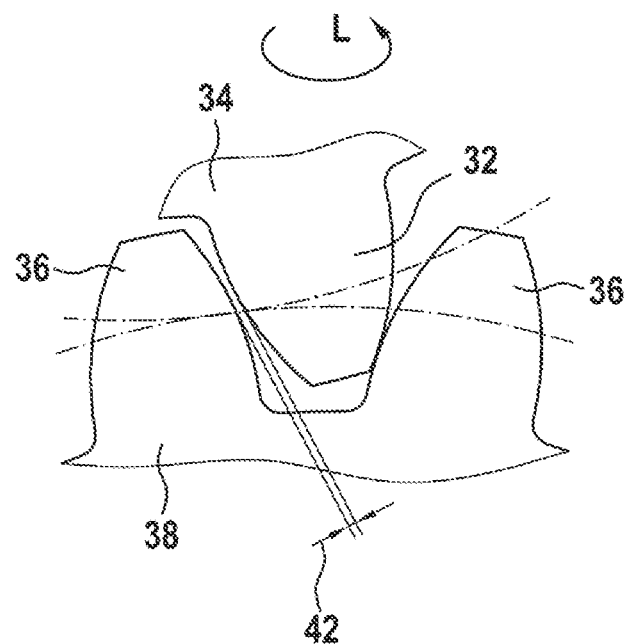
FIG. 3 shows a detail of the transmission from FIG. 1 to illustrate a transmission backlash between two cooperating gearwheels.

FIGS. 2 and 3 show as an example a tooth 32 of a first gearwheel 34, and two adjacent teeth 36 of a second gearwheel 38 of the transmission 20. The tooth 32 engages between the two adjacent teeth 36. The two gearwheels 34 and 38 thus cooperate with each other. FIG. 2 shows a state in which the gearwheel 34 rotates clockwise, i.e. to the right, whereas FIG. 3 shows a state in which the gearwheel 34 rotates counter-clockwise, i.e. to the left. It can be seen that in FIG. 2 the tooth 32 bears against the flank of tooth 36 that is on the left in the figure, whereas it is slightly spaced from the tooth 36 that is on the right in FIG. 2. There is therefore a first backlash 40 between the tooth 32 and the tooth 36 that is on the right in FIG. 2. It can also be seen that in FIG. 3 tooth 32 bears against the flank of the tooth 36 that is on the right in the figure, whereas it is slightly spaced from the tooth 36 that is on the left in FIG. 2. There is therefore a second backlash 42 between the tooth 32 and the tooth 36 that is on the right in FIG. 3.

It is understood that the transmission 20 also has other such pairs of gearwheels that also have corresponding backlashes. The backlashes of all the mutually cooperating gearwheels of the transmission 20 add up to a transmission backlash G.

A procedure for detecting said transmission backlash G is now explained with reference in particular to FIG. 4, in which the electric armature current taken up by the drive motor 16, and thus the drag torque represented by it, is plotted against the angle of rotation $\alpha$ sensed by the Hall sensor 24. First, reference is made to the dashed-line curve. This represents a particular condition point, namely the factory condition of the hand-held power tool 10.

Initially, the drive motor 16 is switched on in a first direction, such that the gearwheel 34 shown as an example in FIGS. 2 and 3 moves in the clockwise direction. This initially causes a backlash present between the tooth 32 and the left-hand tooth 36 in FIGS. 2 and 3 to be reduced until the tooth 32 bears against the flank of the left-hand tooth 36 in FIGS. 2 and 3. The air between tooth 32 and tooth 36 on the left in FIGS. 2 and 3 becomes, as it were, displaced. This also happens between all the other mutually cooperating gearwheels.

Immediately at the beginning of the movement of the drive motor 16, the torque is thus still relatively low, since only the air between the teeth has to be displaced. The more tooth flanks of gearwheels of the transmission 20 bear against each other, the greater the torque M to be applied by the drive motor 16, or the take-up of electric current I, becomes. When the air between all the mutually cooperating gearwheels is displaced, the drive motor 16 for a constant rotational speed must apply a certain torque M1, with which in idling, i.e. without load, in particular the transmission friction as well as the bearing friction is overcome. This torque M1 is substantially constant. It can be seen from FIG. 4 that this state is reached at an angle of rotation $\alpha 1$.

At an angle of rotation $\alpha 2$, the drive motor 16 is actuated in the other opposite direction, i.e. such that the first gearwheel 34 in FIGS. 2 and 3 is rotated counter-clockwise. Thus, the teeth of the mutually cooperating gearwheels, which were previously bearing against each other, come free from each other and, taking the example of the two gearwheels 34 and 38, the air of the first backlash 40 must now be displaced until the situation shown in FIG. 3 is reached. As a result, the torque decreases until it is constant again at a value M2 at an angle of rotation a3, because all the air between the teeth of the transmission 20 is again displaced. The total transmission backlash G of the transmission 20 is now determined as the difference between the two values $\alpha 2$ and $\alpha 3$.

The same procedure is now performed at a later condition point during the service life of the hand-held power tool 10. This condition point is indicated by a solid line in FIG. 4. It can be seen that the difference between the angles of rotation $\alpha 3'$ and $\alpha 2'$, which represents the transmission backlash G', is significantly greater than the transmission backlash G in the factory state of the hand-held power tool 10. The difference in turn between G' and G is a measure of the wear that has occurred in the meantime in the transmission 20, i.e. an abrasion of the flanks of the teeth of the mutually cooperating gearwheels, which in the example of the two gearwheels 34 and 38 of FIGS. 2 and 3 results in a greater first backlash 40 and in a greater second backlash 42.

The procedure just described may be performed multiple times at different condition points during the service life of the hand-held power tool 10, for example after each switch-on and/or after a battery pack change. It is also possible for the procedure just described to be initiated manually by a user of the hand-held power tool 10 via the HMI 28 or the wireless interface 30.

In the open-loop and closed-loop control means 26, the current transmission backlash G' is continuously stored and compared with a limit value stored in the open-loop and closed-loop control means 26. If the current transmission backlash G' reaches the limit value, a notification is output to the user of the hand-held power tool 10, via the HMI 28 and/or the wireless interface 30, that a maintenance measure should be performed in the near future. It is also possible that a notification is output to the user not only when the current transmission backlash G' reaches the limit value, but also when a characteristic of the transmission backlash G' indicates that the limit value will soon be reached.

Figure 5:
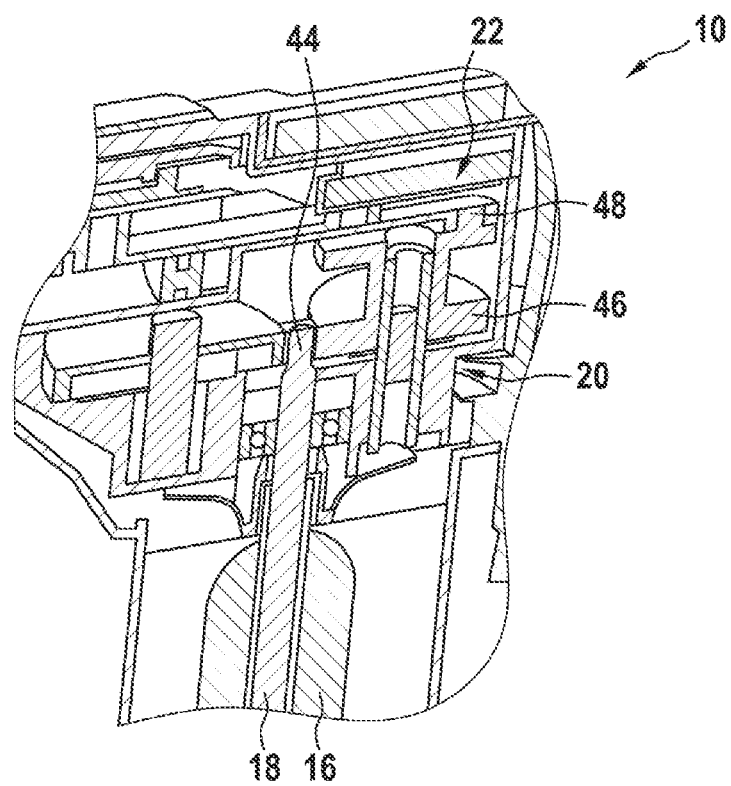
FIG. 5 shows a longitudinal section through a region of a second embodiment of the hand-held power tool in the form of a rotary hammer that has a crank mechanism.

An alternative procedure variant for use with an alternative hand-held power tool 10 will now be explained with reference to FIGS. 5-7. The hand-held power tool 10 of FIG. 5 has a drive shaft 18 provided with a drive pinion 44. This drive pinion 44 cooperates with an eccentric gearwheel 46 of a crank mechanism 48 belonging to an impact drive 22. In such a crank mechanism 48, the pulsed torque generated by an air spring always loads the same teeth on the eccentric gearwheel 46. These consequently form a critical wear point in this type of hand-held power tool 10.

A typical reduction ratio between the drive pinion 44 and the eccentric gearwheel 46 is 1:7. In the case of the procedure variant described below with reference to FIGS. 6 and 7, the transmission backlash G' is determined, for example, for seven successive segments, in each case with a circumferential angle of approximately 51" over the circumference of the eccentric gearwheel 46. Thus, the entire circumference of the eccentric gearwheel 46 is checked.

Figure 4:
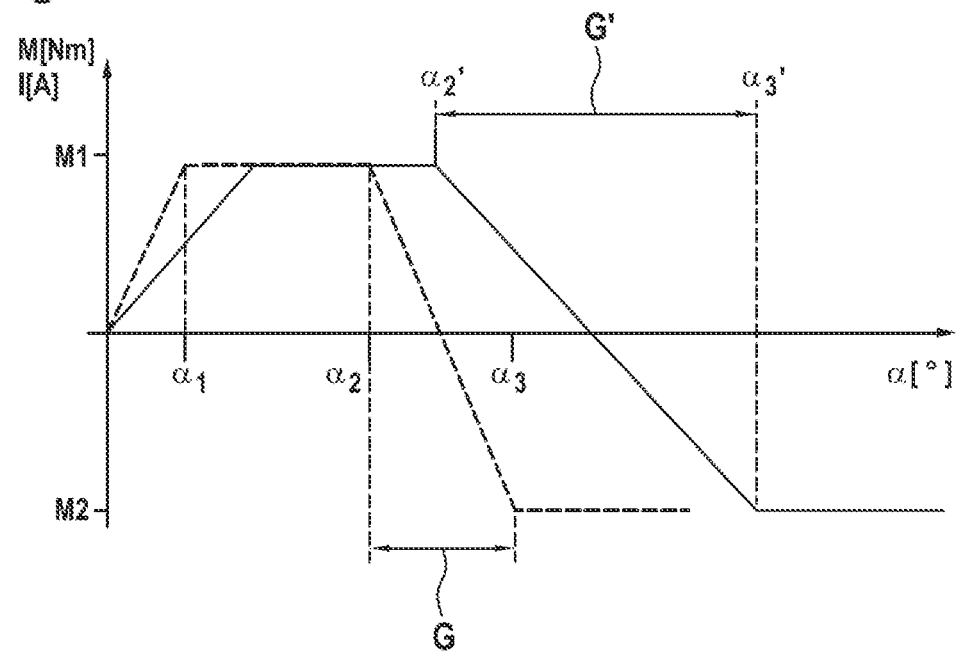
FIG. 4 shows a diagram in which an armature current of the drive motor from FIG. 1 is plotted over an angle of rotation of the drive shaft from FIG. 1 during execution of a procedure for detecting a transmission backlash, at two different condition points of the hand-held power tool.
Figure 6:
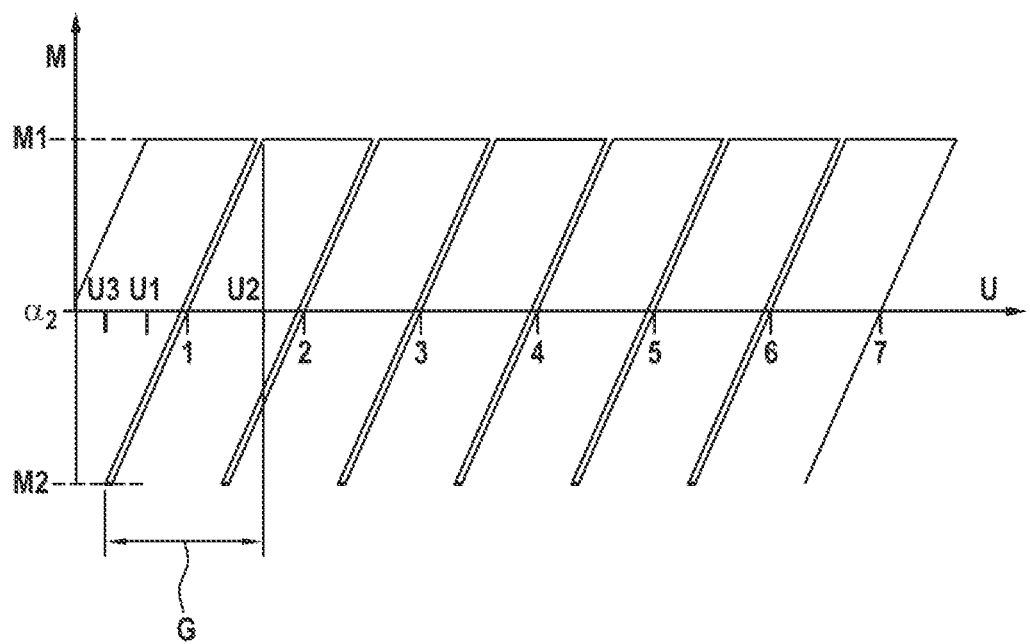
FIG. 6 shows a diagram, similar to FIG. 4, for the hand-held power tool from FIG. 5 at a first condition point.
Figure 7:
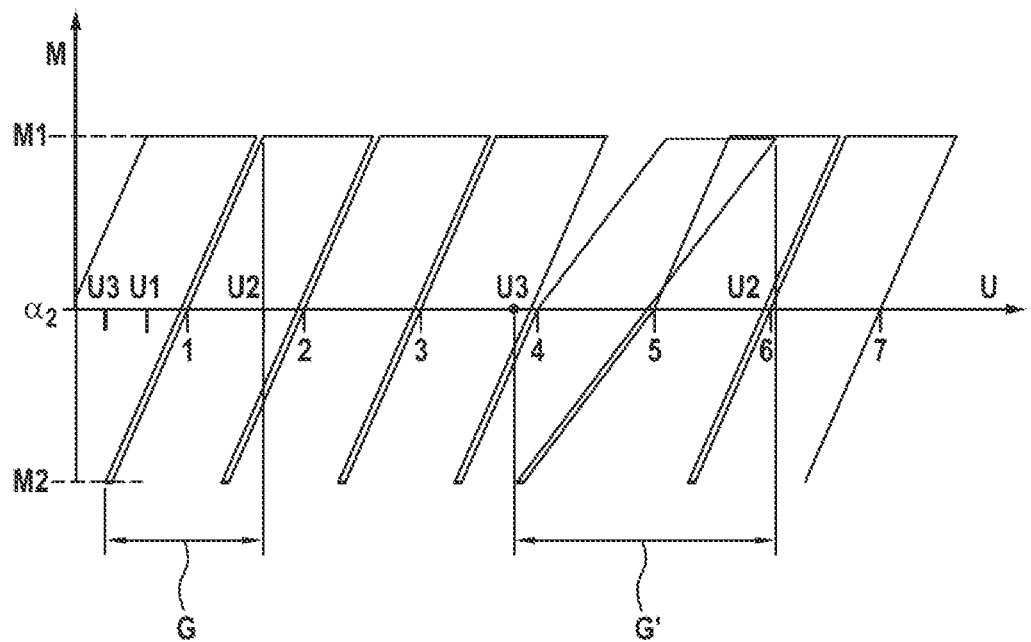
FIG. 7 shows a diagram, similar to FIG. 6, at a second condition point.

FIGS. 6 and 7 are similar to FIG. 4, but instead of the angle of rotation a being plotted on the abscissa of the diagram, the revolutions U of the drive pinion 44 are plotted. It can be seen that the drag torque M1 becomes constant at approximately half a revolution U1 of the drive pinion 44. At a value U2 of the revolution U, the direction of rotation of the drive motor 16 is reversed until the drag torque M becomes constant again at a value M2, which is the case at a revolution value U3. The difference between U2 and U3 reflects the transmission backlash G in this first of seven circumferential sectors of the eccentric gearwheel 46.

This procedure is now repeated for all seven circumferential sectors of the eccentric gearwheel 46. In the case of the factory condition of the hand-held power tool 10 represented in FIG. 6, the transmission backlash G in all seven circumferential sectors is substantially the same.

FIG. 7 shows the diagram of FIG. 6, with the hand-held power tool 10 now at a later condition point in which significant wear has occurred in the fifth circumferential sector of the eccentric gearwheel 46. This can be seen from the fact that the transmission backlash G' in this fifth circumferential sector is significantly greater than in the other circumferential sectors. Here, too, a corresponding evaluation may be effected in the open-loop and closed-loop control means 26, in which the transmission backlashes of the individual circumferential sectors are not only compared with a limit value, but also compared with each other. If, for example, the transmission backlash G' in a circumferential sector deviates significantly from a mean value of the transmission backlashes G' over all seven circumferential sectors of the eccentric gearwheel 46 by more than a limit value, this may also be a reason to alert a user, via the HIM 28 or the wireless interface 30, to a need for maintenance.

Figure 8:
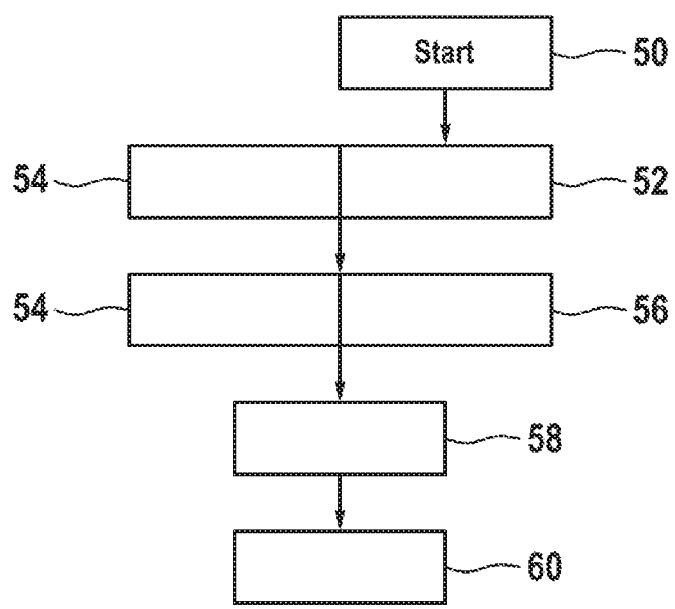
FIG. 8 shows a flow diagram of a procedure for detecting the transmission backlash in one of the hand-held power tools of FIG. 1 or 5.

The procedure for detecting transmission backlash G, described above, is now summarized again in very general terms with reference to FIG. 8:

Following a start in a function block 50, in a function block 52 the drive motor 16 is first actuated in a first direction until the value of the first variable I, representing the drag torque M, is at least approximately constant. At the same time, in a function block 54, the value of the second variable associated with a rotation of the drive shaft 18 of the drive motor 16 is determined. In a function block 56, the drive motor 16 is then actuated in a second direction that is opposite to the first direction of the function block 52. Meanwhile, the value of the second variable associated with the rotation of the drive shaft 18 is again determined in a function block also denoted by 54. In a function block 58, the third variable is then determined, which represents the transmission backlash G or G' of the transmission 20. The change in the second variable determined in function block 54 is used for this purpose. The procedure ends in a function block 60.

What is claimed is:

1. A method for detecting a transmission backlash in a hand-held power tool, the hand-held power tool comprising a drive motor that has a drive shaft, a tool spindle, and a transmission that, in respect of drive, connects the drive shaft to the tool spindle, the method comprising:
automatically rotating the drive shaft of the drive motor in one of a clockwise and a counter clock-wise direction upon at least one of switching on the hand-held power tool and following changing of a battery pack at least until a value of a first variable, representing a drag torque, is at least approximately constant;
monitoring a second variable which is associated with the rotation of the drive shaft of the drive motor during the rotation in the one of the clockwise and the counter clock-wise direction; and
determining a value of a third variable, representing a transmission backlash, based upon a change in the second variable during the rotation in the one of the clockwise and the counter clock-wise direction.

2. The method according to claim 1, wherein:
prior to rotating the drive shaft of the drive motor in the one of the clockwise and the counter clock-wise direction, the drive motor is rotated in the other of the clockwise and the counter clock-wise direction until the value of the first variable representing the drag torque is at least approximately constant.

3. The method according to claim 1, further comprising:
comparing the value of the third variable with a third variable value determined at an earlier condition point of the power tool; and
determining a current state of wear based upon the comparison.

4. The method according to claim 3, wherein the earlier condition point is a factory condition.

5. The method according to claim 1, further comprising: storing the value of the third variable.

6. The method according to claim 1, wherein:
the hand-held power tool has a reduction gear comprising a pinion and a gearwheel: and
determining the value of the second variable and determining the value of the third variable are each performed multiple times in succession for respective circumferential portions of the gearwheel.

7. The method according to claim 1, wherein the third variable is an angle of rotation of the drive shaft of the drive motor.

8. The method according to claim 1, wherein the first variable is an armature current of the drive motor.

9. The method according to claim 7, wherein:
the drive motor is a brushless electric motor; and
the angle of rotation is sensed by at least one Hall sensor.

10. The method according to claim 1, further comprising:
manually triggering the method of claim 1, using an application on a mobile operating device.

11. The method according to claim 1, further comprising:
generating a message to a user based upon at least one of an absolute value of the third variable and a characteristic of the value of the third variable.

12. A hand-held power tool configured to execute the method of claim 1.

13. The hand-held power tool according to claim 12, wherein the hand-held power tool is configured to operate in at least two different operating modes.

14. A method for detecting a transmission backlash in a hand-held power tool, the hand-held power tool comprising a drive motor that has a drive shaft, a tool spindle, and a transmission that, in respect of drive, connects the drive shaft to the tool spindle, the method comprising:
actuating the drive motor at least until a value of a first variable, representing a drag torque, is at least approximately constant;
monitoring a second variable which is associated with a rotation of the drive shaft of the drive motor during the actuation; and
determining a value of a third variable, representing a transmission backlash, based upon a change in the second variable during the actuation,
wherein:
the hand-held power tool has a reduction gear comprising a pinion and a gearwheel: and
determining the value of the second variable and determining the value of the third variable are each performed multiple times in succession for respective circumferential portions of the gearwheel.

15. The method according to claim 14, further comprising:
automatically performing the method of claim 14 upon at least one of switching on the hand-held power tool and following changing of a battery pack.

16. The method according to claim 14, further comprising:
manually triggering the method of claim 14 using an application on a mobile operating device.

* * * * *